United States Patent [19]

Bouvot

[11] Patent Number: 4,580,758
[45] Date of Patent: Apr. 8, 1986

[54] FLUID FLOW SELECTOR VALVE FOR VEHICLE ENVIRONMENTAL CONTROL SYSTEM

[75] Inventor: Jean-François Bouvot, Dampierre, France

[73] Assignee: VALEO, Paris, France

[21] Appl. No.: 664,019

[22] Filed: Oct. 23, 1984

[30] Foreign Application Priority Data

Oct. 24, 1983 [FR] France .................. 83 16915

[51] Int. Cl.⁴ .................. F16K 31/143; F15B 9/10
[52] U.S. Cl. .................. 251/25; 137/625.21; 137/625.48; 91/357; 91/368
[58] Field of Search ............ 91/368, 357; 251/59, 251/25; 137/625.21, 625.48

[56] References Cited

U.S. PATENT DOCUMENTS 3,072,108  1/1963  Cripe .
3,125,001  3/1964  Cripe .
3,187,640  6/1965  Young et al. .
3,731,729  5/1973  Beatenbough et al. ..... 137/625.21 X

FOREIGN PATENT DOCUMENTS 2457401  12/1980  France .

OTHER PUBLICATIONS

Patent Abstract, Japan, 55-110617, Nov. 11, 1980, Nippon Denso K.K., vol. 4, No. 161.

Primary Examiner—Arnold Rosenthal
Attorney, Agent, or Firm—Dennison, Meserole, Pollack & Scheiner

[57] ABSTRACT

A fluid flow selector valve for controlling step-by-step displacement of an on/off actuator (12), e.g. for controlling a flap in an installation for heating or for air conditioning the cabin of a motor vehicle. The valve comprises two mutually movable elements (80, 84) defining at least two chambers (90, 92) therebetween suitable for connecting the actuator feed inlet (30) to a source of fluid pressure (72) or to an exhaust. The valve further comprising an intermediate chamber (94) suitable for connecting the feed inlet to the source of fluid pressure (72), to the exhaust, or to an air tight seal.

10 Claims, 6 Drawing Figures

FLUID FLOW SELECTOR VALVE FOR VEHICLE ENVIRONMENTAL CONTROL SYSTEM

The present invention relates to a fluid flow selector valve for step-by-step control of an actuator, in particular for use in a heater or air conditioner installation for the passenger compartment of a motor vehicle. The invention also relates to such an installation including said selector valve.

BACKGROUND OF THE INVENTION

One known way of controlling the position of a moving member which is rotatable about an axis or which is translatable in a plane (e.g. a flap or the like disposed in an air duct in a heater or air conditioner installation) is direct control by means of a cable having one end connected to the member to be moved, and its other end connected to control means such as a cursor, a lever, or the like. However, this type of control must be associated with brake means for keeping the moving member in the selected position in spite of other forces which may be exerted thereon (forces due to the flow of air past the flap, due to vibrations, etc.).

Another known way of controlling the position which requires less force than a cable-and-brake arrangement consists in moving the moving member by means of an actuator jack (generally an on/off actuator) which is connected to a source of fluid pressure and to an exhaust via a selector valve or switch under user control. This technique can be used to obtain either a continuous displacement of the moving member between two extreme positions, or else to obtain a step-by-step displacement of the moving member which then occupies a set of predetermined positions. In the latter case, multiposition actuators are generally used having cylinders comprising a plurality of chambers delimited by deformable membranes, and having a plurality of inlet orifices for feeding fluid under pressure to respective ones of the actuator chambers.

Such actuators are relatively expensive, and only limited numbers of positions are available for moving members under their control.

Preferred embodiments of the present invention provide a fluid flow selector valve for supplying fluid under pressure to an actuator for step-by-step control of a moving member between predetermined positions, but capable of using an ordinary on/off type of actuator and without the number of available positions being limited by the actuator.

SUMMARY OF THE INVENTION

The present invention provides a fluid flow selector valve for controlling step-by-step displacement of an on/off actuator, the valve comprising two mutually movable elements defining at least two chambers therebetween, a duct on a first of said elements for connecting the actuator feed inlet to one or other of the chambers as a function of the relative position of the two elements, ducts on the second element each leading to one of the above-mentioned chambers to connect said chambers to the source of fluid pressure and to an exhaust, and a linkage connecting the piston rod of the actuator to one of the elements to displace it in one direction or the other relative to the other element, with the improvement wherein the element which is not connected to the piston rod of the actuator is fixed in position and wherein an intermediate chamber into which the duct connected to the actuator feed inlet may open out is provided between the above-mentioned two chambers to separate them from each other said intermediate chamber being suitable for being connected either to the source of fluid pressure or to the exhaust or else to be isolated therefrom.

This structure of a selector valve for feeding fluid to the actuator thus makes it possible, by virtue of the intermediate chamber provided between the other two chambers, to determine three stable positions of the actuator piston, and thus of the moving member driven thereby.

In a particularly simple and advantageous manner, a selector valve in accordance with the invention may comprise $(n-1)$ intermediate chambers and n chambers arranged in pairs and separated by respective intermediate chambers, where n is an integer greater than or equal to 2. $2n-1$ predetermined stable piston positions are thus obtained.

Further, the initial adjustment of the position of the fixed element of the valve may be used to accurately adjust the stable intermediate positions of the piston rod and thus of the moving member.

Advantageously, the fixed element of the selector valve is interposed between the above-mentioned moving element and a second moving element to define therewith an additional chamber which is permanently connected to the source of fluid pressure and which is suitable for communicating with the above-mentioned chambers via holes through the fixed element depending on the position of the second moving element relative to the fixed element.

This provides a compact valve which is connected via a single duct to the source of fluid pressure, and in which the second moving element is moved relative to the fixed element to take up predetermined positions by means of a control lever and/or cable.

The present invention also provides a heater or air conditioner installation for a motor vehicle, said installation including at least one fluid flow selector valve of the above-defined type for controlling step-by-step displacement of the piston rod of an on/off type actuator which rod is connected to a flap or the like located in an air duct in said installation.

In this application the source of fluid pressure is, in fact, a source of low pressure, i.e. a pressure less than atmospheric pressure, and the exhaust from the actuator is constituted by a simple orifice communicating with the surrounding air.

BRIEF DESCRIPTION OF THE DRAWINGS

Embodiments of the invention are described by way of example with reference to the accompanying drawings, in which.

MORE DETAILED DESCRIPTION

Figure 1:
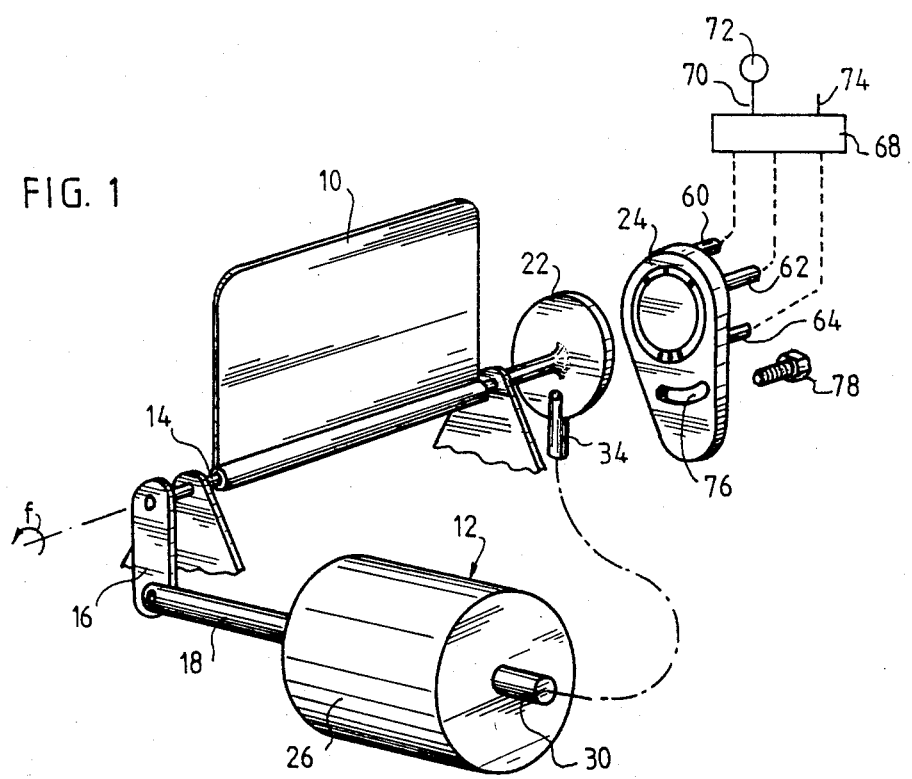
FIG. 1 is a diagrammatic perspective view of a first embodiment of the invention.
Figure 3:
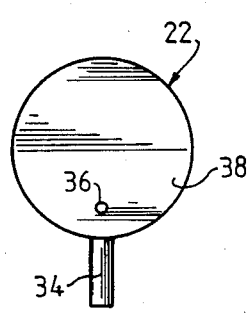
FIG. 3 is a view of one element of the valve as seen looking along arrow III in FIG. 2.

Reference is made initially to FIG. 1 which shows an application of a fluid flow selector valve in accordance with the invention for controlling step-by-step displacement of a flap 10 by means of an actuator 12 of completely conventional, single-action type.

The flap 10 is fixed to rotate with a shaft 14 having one end connected by a crank 16 to the piston rod 18 of the single-action actuator 12, and having its other end connected to rotate a first element 22 of a selector valve in accordance with the invention that includes a fixed second element 24.

Figure 5:
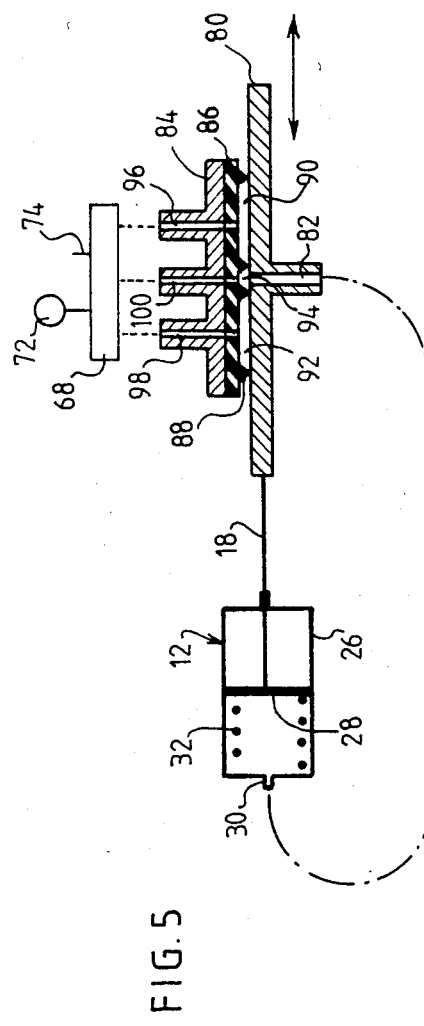
FIG. 5 is a diagrammatic section through a second fluid flow selector valve in accordance with the invention.

As can be seen more clearly in FIG. 5, the actuator 12 is of a quite ordinary type: it comprises a cylinder 26 housing a slidably mounted piston 28 connected to the piston rod 18. The piston is slidably sealed to the cylinder in conventional manner. The end of the cylinder 26 opposite to the end via which the piston rod leaves has a feed or orifice 30 for connection to a source of reduced pressure (i.e. to a source of pressure below atmospheric pressure). A compression spring 32 is interposed between said end including the orifice 30 and the piston 28. In a variant the actuator could be supplied with air at greater than atmospheric pressure, in which case the compression spring 32 would be placed on the other side of the piston.

Figure 2:
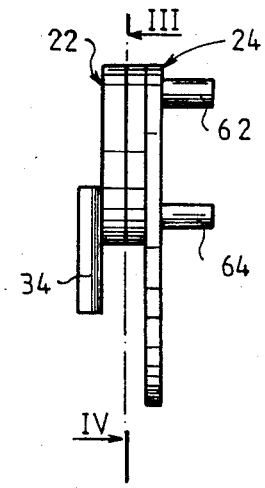
FIG. 2 is a side view of a fluid flow selector valve in accordance with the invention, and as used in the FIG. 1 embodiment.
Figure 4:
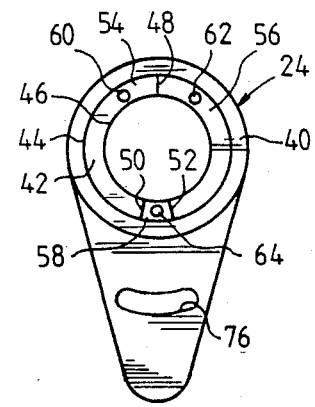
FIG. 4 is a view of the other element of the valve as seen looking along arrow IV of FIG. 2.

The selector valve is shown in an exploded perspective view in FIG. 1, and assembled in FIG. 2.

The moving element 22 of the valve mounted on the flap shaft 14 is a simple disk having a fluid passage therethrough constituted by a duct 34 suitable for connection to the actuator control orifice 30, and by an orifice 36 which opens out in the inside face 38 of the moving element 22.

The fixed valve element 24 (i.e. the element which is normally fixed against rotation about the axis of the shaft 14) has a sealing ring 42 set into its inside face 40. The sealing ring 42 comprises first and second concentric lips 44 and 46 together with radial lips 48, 50 and 52 thereby defining first and second chambers 54 and 56 which extend over respective large arcs, and a third chamber 58 extending over a small arc.

The fixed element 24 further includes three fluid flow ducts 60, 62 and 64 opening out in respective ones of the three chambers 54, 56 and 58, i.e. all of the ducts open out between the concentric lips 44 and 46, and each of them opens out between a different pair of the radial lips 48, 50, 52.

When the moving and fixed valve elements 22 and 24 are assembled together and mounted so that the moving element 22 moves with the flap shaft 14 and relative to the fixed element 24, the sealing lips 44 to 52 of the sealing ring fitted to the fixed element 24 are pressed against the inside face 38 of the moving element 22. The orifice 36 in the face 38 of the moving element 22 is located between the concentric lips 44 and 46, i.e. in one or other of the three chambers 54, 56 and 58, depending on the relative angular position of the moving element 22 and the fixed element 24.

The ducts 60, 62 and 64 of the fixed element 22 are connected to the outlets from a conventional selector valve 68 having one inlet 70 connected to a source 72 of low pressure and another inlet 74 open to the atmosphere. The conventional valve 68 selectively connects the conduit 64 leading to the small or intermediate chamber 58 of the valve 22, 24 either to the source of reduced pressure 72, or to the exhaust, or else to a fluid seal. The other ducts 60 and 62 are selectively connectable either to the source of reduced pressure 72 or else to the exhaust, i.e. to the atmosphere.

When the orifice 36 of the fluid passage through the moving element 22 opens out into one of the chambers 54, 56 or 58 having its corresponding duct 60, 62 or 64 connected via the selector valve 68 to the source 72 of reduced pressure, the actuator 12 is fed with low pressure and its piston rod 18 tends to move further into the cylinder 26 against the return force of the compression spring 32. The flap 10 is thus caused to rotate about the axis of the shaft 14 in the direction indicated by arrow f in FIG. 1.

When the orifice 36 of the moving element 22 opens out into one of the chambers 54, 56 or 58 having its corresponding duct 60, 62 or 64 connected via the selector valve 68 to the exhaust (i.e. to the atmosphere), the actuator 12 is connected to the exhaust, the return spring 32 expands, and pushes the piston 18 out from the cylinder 26. The flap then rotates in the opposite direction to the arrow f.

When the orifice 36 of the moving element 22 opens out into the intermediate chamber 58 having its duct 64 sealed by the selector valve 68, the actuator is connected neither to its driving pressure feed nor to the exhaust, and the position of the flap 10 should remain stable. Thereafter, the flap 10 may be moved one way or the other by operating the selector valve 68 so that the duct 64 is connected either to the source of reduce pressure 72 or else to the exhaust.

Naturally there are end stops to limit rotation of the flap 10 and thus to limit rotation of the moving element 22 relative to the fixed element 24, thereby preventing the orifice 36 in the moving element 22 from passing directly from the first chamber 54 to the second chamber 56 over the radial lip 48.

Advantageously, the fixed element 24 includes a opening 76 through which a fixing screw 78 is passed to lock the fixed element 24 to the fixed structure within which the flap 10 moves. The opening 76 is arcuate so that the exact position of the intermediate chamber in the element 24 may be fixed relative to the duct in which the flap 10 is to operate.

The apparatus described above operates as follows:

The selector valve 68 is a three-position valve. In a first position, all three ducts 60, 62, 64 are connected to the atmosphere, and the piston rod 18 of the actuator 12 is fully extended from the cylinder 26 with the flap 10 being in a first extreme position having rotated as far as it will go about the axis of the shaft 14 in the opposite direction to the arrow f. The orifice 36 of the moving element 22 opens out into the first chamber 54.

In a second position of the valve 68, adjacent to the above-mentioned first position, the duct 60 leading to the chamber 54 is connected to the source of reduced pressure 72, and the duct 64 leading to the intermediate chamber 58 is closed in an air-tight manner. The actuator is thus fed from the supply of reduced pressure and the piston rod 18 moves into the cylinder 26 rotating the flap 10 about the axis of the shaft 14 in the direction of the arrow f until the orifice 36 of the moving element 22 opens out into the intermediate chamber 58, thereby stopping the flap 10.

In a third position of the valve 68 adjacent to the above-mentioned second position, the duct 64 of the intermediate chamber 58 and the duct 62 of the second chamber 56 are connected to the source of reduced pressure 72, while the duct 64 of the first chamber may either be connected to the source of reduced pressure or else to the atmosphere. The actuator 12 is again fed with reduced pressure, the piston rod 18 moves further into the cylinder 26, and the flap 10 rotates about the axis of the shaft 14 in the direction of the arrow f until it reaches a stop.

The flap 10 is moved in the opposite direction by moving the valve 68 from its third position to its second position, and from its second position to its first position.

The fluid flow selector valve 22, 24 shown in FIGS. 1 to 4 thus makes it possible to control the flap 10 so that it takes up any one of three possible predetermined positions (two extreme positions and one intermediate position). The number of predetermined positions may be increased by increasing the number of chambers 54, 56, 58 in the sealing ring 44 of the fixed element 24. The number of intermediate chambers 58 in the sealing ring 44 determines the number of intermediate positions of the flap 10 between its extreme positions.

Reference is now made to FIG. 5 which is a diagram of a second embodiment of a fluid flow selector valve in accordance with the invention. This second embodiment differs from the first embodiment shown in FIGS. 1 to 4 in that the moving element of the valve now moves in rectilinear translation, instead of rotating about an axis.

The FIG. 5 valve comprises a moving element 80, corresponding to the disk 22 and connected to the piston 18 of a single action actuator 12. The moving element 80 has a fluid passage 82 passing therethrough and opening out at one end in the upper face (as shown in the figure) of the moving element 80 and being connected at its other end to the feed orifice of the actuator 12.

The fixed member 84 of the valve is a plate whose underside (as shown in the figure) is fitted with a seal 86 having lips 88 applied against the upper face of the moving element 80 and defining therewith first and second large chambers 90 and 92 separated by a small intermediate chamber 94. Ducts 96, 98 and 100 lead from the fixed element 84 to connect the chambers 90, 92, 94 to the three outlets from the selector 68 having its two inlets connected to the source of reduced pressure 72 and to the atmosphere.

The fluid flow selector valve shown in FIG. 5 operates in exactly the same manner as the valve shown in FIGS. 1-4.

Figure 6:
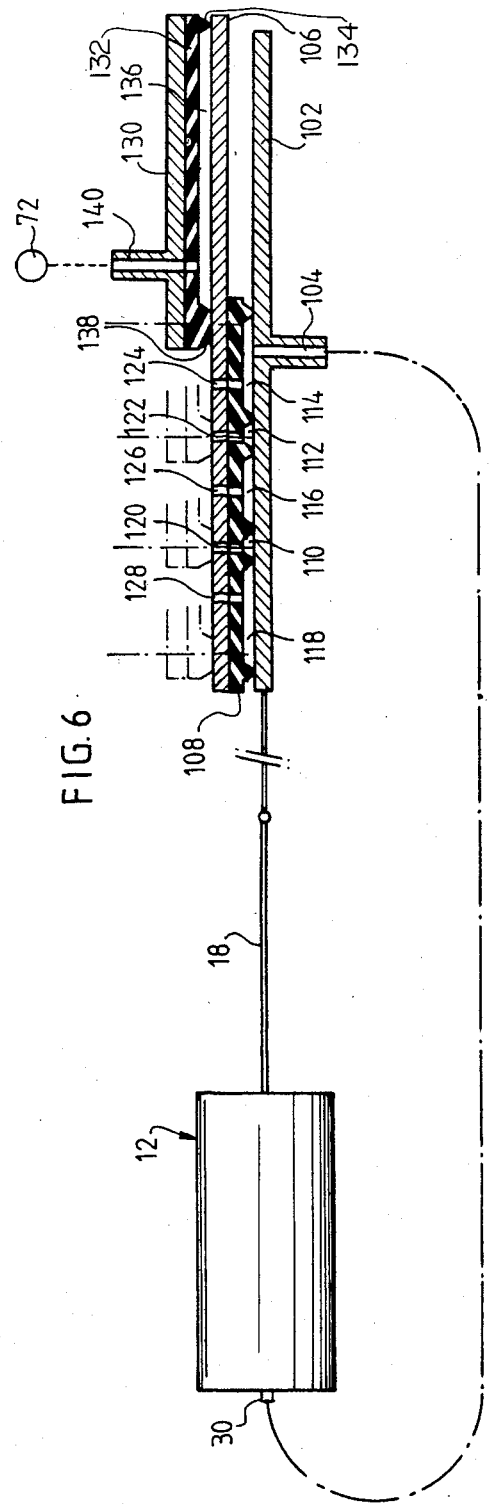
FIG. 6 is a diagrammatic section through a third fluid flow selector valve in accordance with the invention.

FIG. 6 shows a variant of the FIG. 5 valve. This variant is capable of selecting four different positions of the piston rod 18 of the single-action actuator 12.

The first or moving element 102 of the valve is identical to the moving element 80 of the FIG. 5 valve and includes a fluid passage 104 having one end connected to the feed orifice 30 of the actuator and having its other end opening out in the top surface (as shown in the figure) of the moving element 102. The fixed element 106 of the valve is a plane plate having a seal 108 facing the moving element 102 with lips applied to the upper surface thereof and defining two intermediate chambers 110 and 112 located between three larger chambers 114, 116 and 118. Holes 120, 122, 124, 126 and 128 pass through the plate 106 and the seal 108 to open out into the chambers 110, 112, 114, 116, and 118 respectively.

Above the fixed element 106, there is a second moving element 130 likewise in the form of a plane plate having a seal 132 on its lower face applied against the upper face of the fixed element 106. The seal 132 has a peripheral lip 134 determining a chamber 136. A portion 138 of the lip 134 is of increased thickness and serves to seal a selected one of the orifices 120-128 through the fixed element 106.

The second moving element 130 further includes a fluid passage 140 leading at one end to the chamber 136 and at its other end to the source of reduced pressure 72.

The second moving element 130 is movable in translation relative to the fixed element 106 under user control applied by means of a cursor and/or of a cable, while the first moving element 102 is movable in translation in its own plane beneath the fixed element 106 as for the FIG. 5 embodiment.

The FIG. 6 valve operates as follows:

In the position shown the actuator 12 is connected to exhaust by the fluid passage 104, the chamber 114 and the hole 124 through the fixed element 106. The piston rod 16 is therefore fully extended from the actuator cylinder, and the moving member connected thereto is in a first extreme or end position.

To move the moving member to a second predetermined position, the second moving element 130 is moved in translation over the fixed element 106 until the thick portion 138 of the seal closes the hole 122 leading to the intermediate chamber 112. The hole 124 through the fixed element 106 then puts the chamber 114 in communication with the chamber 136 which is connected to the source of reduced pressure 72 so that the actuator 12 is fed with reduced pressure. The piston rod 18 thus starts to move out of the cylinder 26 taking with it the moving member 102 until the outlet of the passage 104 is aligned with the intermediate chamber 112. The passage 104 is then isolated from the source of reduced pressure and the actuator stops moving with the moving member driven thereby coming to rest in a second predetermined position.

To move the the moving member to a third predetermined position, the second moving element 130 is moved a second time relative to the fixed element 106 until the thick portion 138 of the seal closes the hole 120 leading to the second intermediate chamber 110. As soon as the thick portion 138 of the seal opens the hole 122, the intermediate chamber 112 is put into communication with the source of reduced pressure 72 via the chamber 136 and the actuator is again fed with reduced pressure. The piston rod 18 therefore continues to move into the cylinder 26 and the first moving element 102 continues to move relative to the fixed element 106 until the end of the passage 104 is in the second intermediate chamber 110. The feed to the actuator is then once again isolated from the source of reduced pressure and from the atmosphere, and the piston rod 18 comes to rest again, with the moving member driven thereby being in a third predetermined position.

To move the moving member into the fourth or opposite end predetermined position, the second moving element 130 is moved again until the thick portion 138 of the seal 132 lies beyond the hole 128 leading to the end chamber 118. Once the thick portion 138 opens the hole hole 120, the second intermediate chamber 110 is connected to the source of reduced pressure 72 via the chamber 136 and the piston rod 18 moves fully into the cylinder 26, thereby moving the first moving element 102 to bring the opening of the passage 104 into the end chamber 118. The movement continues until the moving member abuts against an end stop which defines the fourth predetermined position.

The moving member is moved in the opposite direction by moving the second moving element 130 back in the opposite direction to that described above, i.e. from left to right in the figure.

In the embodiment shown, the size of the chamber 136 is such that when the moving member is in its fourth predetermined position, all of the holes 120 to 128 through the fixed element 106 open out into the chamber 136.

It will be observed that in all the embodiments, the lips of the seals delimiting the intermediate chambers 58, 94, 110 or 112 are not wide enough to close the open end of the passage 36, 82 or 104 in the moving element and leading to the feed orifice of the actuator.

The embodiment shown in FIG. 6 has the advantage of providing a fluid flow selector valve which is complete in itself (no second valve 68) and which is compact. Its connections to the source of reduced pressure and to the feed orifice of the actuator are reduced to the smallest possible number.

A valve including a second moving element such as the element 130 in FIG. 6 could operate in rotation as described with reference to FIGS. 1 to 4 rather than in translation as described with reference to FIG. 6.

I claim:

1. A fluid flow control device for controlling step-by-step displacement of an on/off actuator by means of a selector valve, said actuator comprising a cylinder, a piston rod reciprocable therein and a feed inlet, said actuator valve comprising two mutually movable elements defining at least three chambers therebetween, a duct on a first of said elements for connecting the actuator feed inlet to one or the other of the chambers as a function of the relative position of the two elements, ducts on the second element each leading to one of the chambers to connect said chambers to a source of fluid pressure and to an exhaust, and a linkage connecting the piston rod of the actuator to the first element to displace it in opposite directions relative to the second element which is fixed in position, wherein said chambers comprise an intermediate chamber provided between the two other chambers to separate them from each other, said intermediate chamber being suitable for selective connection to the source of fluid pressure and to the exhaust, and further being suitable to be isolated therefrom for defining an intermediate position of the actuator piston rod, and the two other chambers being each suitable for selective connection to the source of fluid pressure and to the exhaust for defining two opposed positions of the actuator piston rod.

2. A valve according to claim 1, including (n−1) intermediate chambers located between adjacent pairs of n chambers, where n is an integer greater than two.

3. A valve according to claim 1, wherein said elements are constituted by plates which are applied against one another in sealed manner by seals that define said chambers between the said elements.

4. A valve according to claim 3, wherein the said plates are coaxial disks, one of which is fixed and the other of which is rotatable relative thereto about their common axis.

5. A valve according to claim 4, wherein the angular position of the fixed element about the common axis is adjustable.

6. A valve according to claim 3, wherein the said plates are parallel plates one of which is fixed and the other of which is movable relative thereto, and wherein the movable plate is movable in translation in its own plane relative to the fixed plate.

7. A valve according to claim 1, wherein the said fixed element is interposed between the said moving element and a second moving element defining together with the fixed element an additional chamber which is permanently connected to the source of fluid pressure and which, depending on the position of the second moving element relative to the fixed element, is suitable for communicating with the said chambers via holes through the said fixed element.

8. A valve according to claim 7, wherein the second moving element includes a seal delimiting said additional chamber in conjunction with the fixed element, said seal including a lip suitable for closing in an airtight manner those of said holes through the fixed element which lead to the intermediate chambers formed between the fixed element and the first moving element.

9. A valve according to claim 7, wherein the second moving element is movable in translation over the fixed element by means of a lever and/or cable control.

10. An installation for heating or for air conditioning a motor vehicle and including at least one fluid flow selector valve as claimed in claim 1 for controlling displacement of a moving member such a a flap or the like lodged in a duct for conveying air through said installation, said flap or the like being connected to the piston rod of the actuator.

* * * * *